Dec. 18, 1928.  
J. A. YUNCK  
1,695,791  
LEADING-IN WIRES FOR EVACUATED CONTAINERS AND PROCESS OF MAKING SAME  
Filed Aug. 6, 1927
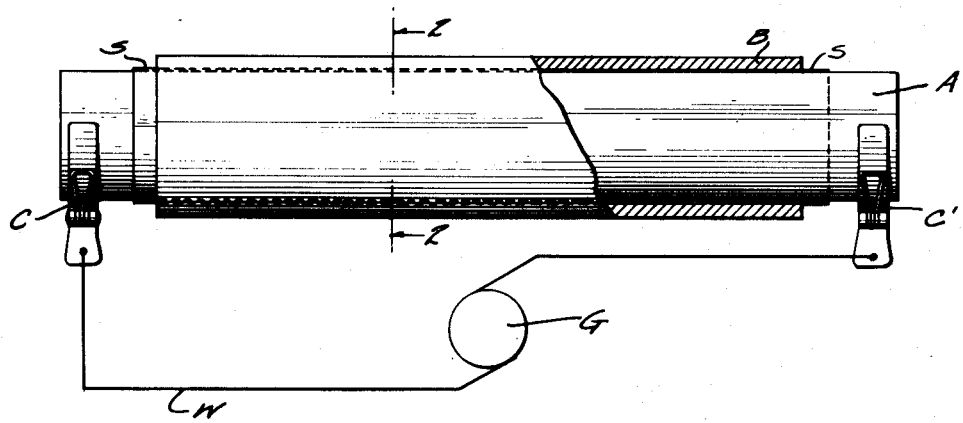
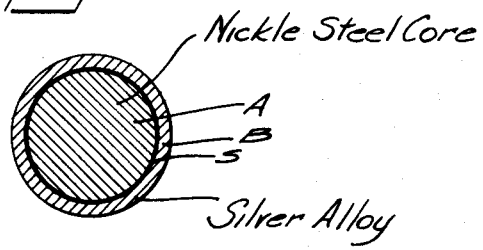
INVENTOR  
John A. Yunck.  
BY  
ATTORNEY Patented Dec. 18, 1928.

1,695,791

UNITED STATES PATENT OFFICE.

JOHN ADAM YUNCK, OF SOUTH ORANGE, NEW JERSEY.

LEADING-IN WIRES FOR EVACUATED CONTAINERS AND PROCESS OF MAKING SAME.

Application filed August 6, 1927. Serial No. 211,252.

This invention relates generally to electric lamps, radio tubes, and vacuum tubes and similar airtight and evacuated structures of glass, and more particularly comprises an improved composition or alloy of different metals forming an exterior sheath or covering for composite leading-in wires, as well as an improved method of welding said sheath to the core of nickel iron commonly employed in making such composite lead-in wires.

In the preferred form of the invention said sheath consists of an alloy of copper and silver, with a minor proportion of tin, but the tin may be omitted, and an alloy of copper and silver alone employed. The silver should always be in excess.

The preferred composition for the core is an alloy of about sixty percent (60%) iron and forty percent (40%) nickel, and that for the sheath about sixty-seven percent (67%) silver, thirty-one and a half percent (31½%) copper and one and a half percent (1½%) tin, by weight, the constituents being fused together in the usual way.

The sole purpose of adding the stated small percentage of tin is to facilitate the fusion and make the alloy more workable. It has no appreciable effect on the electrical conductivity of the alloy.

I can avoid the use of tin by making an alloy of silver and copper alone in two steps, first making up an alloy of about ninety percent (90%) silver and ten percent (10%) copper, and then adding twenty-five (25) parts by weight of copper to seventy-five (75) parts by weight of the said silver alloy. The result is a final alloy of about sixty-seven and a half percent (67½%) silver and thirty-two and a half percent (32½%) of copper.

The silver and copper alloy, or the silver-copper-tin alloy is cast in the form of a short tube, and the nickel iron is cast in the form of a solid cylinder of the same length which will fit snugly into the silver alloy tube after said cylinder has been covered with a coating of soft brass solder or silver solder not over .002 inch thick.

The diameter of nickel steel or iron core should be about four-fifths of the exterior diameter of the silver alloy tube, to cause the coefficient of expansion and contraction under heat variation of the composite wire to be formed therefrom to be substantially the same as that of lamp glass. The coefficient of expansion of the silver copper alloy sheath is somewhat above that of the glass and that of the nickel steel or iron core is somewhat less than that of glass, but when core and sheath are welded together and drawn down into wire the coefficient of the said composite wire is the mean of the coefficients of sheath and core and is equal to that of the glass, or near enough thereto to form an airtight seal with the glass which will not crack and leak when the lamp is alternately lighted and extinguished.

The welding of sheath to core is preferably done by passing an electric current of sufficient quantity through the composite billet thus formed to fuse the solder and perhaps produce incipient fusion of the silver copper alloy at the inner surface of the sheath so that it may be firmly united to the nickel steel or iron core when the hot billet or rod is run quickly through a swaging machine.

This preliminary heating before swaging could be done in a gas or other heater but there is danger of melting the silver copper alloy sheath, as the greatest heat is then applied to the sheath and the gas flames cannot be so accurately controlled as can the heating current of electricity, and there is also danger that the flames may develop impurities in the sheath surface.

After the rod or billet has been thus welded it is allowed to cool, worked down by swaging to a diameter of about three eighths (⅜) of an inch, and finally drawn down to lamp size, or other desired size, in the usual way.

The wire may be coated with a thin film of enamel or lacquer to prevent the surface of the sheath from oxidizing or tarnishing, by action of atmospheric moisture and gases, if it is not to be used immediately.

A diagrammatic representation of an apparatus for carrying out the above described process is shown in the accompanying sheet of drawings in which Fig. 1 represents the assembled core and tube or sleeve connected to an electric circuit for welding, parts being shown broken away or in section, and Fig. 2 is a cross section on line 2—2 of Fig. 1.

Referring to the drawings, A is the nickel iron core, B the silver alloy tube or sleeve, C, C' clamps connecting the core ends to terminals of the electric circuit W, which is supplied with current from generator G, and S is the thin coating of soft brass solder or silver solder applied to the surface of the core A to unite it firmly to the sleeve B when heated sufficiently by the passage of current through said core A.

The advantages of the invention over platinum wire and over platinum-coated or copper coated wire, comprise the possibility of reducing the nickel content of the core below the amount usually employed in copper-covered or platinum-covered wire, and the action of the silver and copper, or silver, tin and copper alloy, in absorbing or reducing any oxygen liberated in the high vacuum of the lamp interior after such lamp has been put into use. That is to say, the portions of the leading-in wires of my invention extending into the lamp interior have such an affinity for oxygen in a high vacuum that they act as "getters" for any residual oxygen in the lamp, and for any liberated therein from the filament during use of the lamp. The advantage resulting from a reduction of the quantity of nickel is the greater capacity of the composite wire to conduct heat, nickel being a relatively poor heat-conductor as compared with steel, iron, silver or copper. The greater the heat-conducting capacity of the leading-in wires the cooler the lamp seal when the lamp is in use, as the heat of the lamp is then more rapidly conducted away to the cool wires of the supply circuit. The cooler the seal the less likely it is to crack and leak.

I am aware that it has been heretofore proposed to use pure silver as the sheath for composite leading-in wires, but pure silver absorbs or adsorbs oxygen at room temperatures and atmospheric pressure, as well as under high vacuum and heat. As a result the pure silver coating, when heated in forming the seal, gives up the previously absorbed or adsorbed oxygen and thus produces gas bubbles in the seal which cause it to be defective, and to leak. I have discovered that an alloy of silver and copper of substantially the proportions above given will not absorb or adsorb oxygen under atmospheric pressure and room temperature and so this trouble is avoided, but it still has sufficient affinity for oxygen, or power of absorption or adsorption, under the conditions of high vacuum and heat existing in the interior of an incandescent lamp, radio tube, or other vacuum apparatus, to exert the so-called "getter" action above referred to when the filament is incandesced.

The electric welding process above described has an important advantage in that as the core composed of nickel and iron has a higher resistance to the passage of current than has the copper and silver alloy sheath, the core is heated to a slightly greater extent than is the sheath, and a portion of this excess heat of the core is conducted to the sheath, during the operation, with the result that the greatest heating effect on the sheath is exerted at the inner surface thereof, where it is in contact with the core, the exact point where the welding action is to be produced, while the exterior of the sheath, being cooled slightly by radiation, does not reach the melting point and there is consequently no probability of the sheath being destroyed by a slight excess of heat applied in the welding operation.

Zinc could be substituted for tin, having a similar effect in facilitating the formation and working of the silver and copper alloy, but it is liable to partially volatilize in the formation of the alloy.

Preferably I make the nickel-iron core for the original billet, fifty hundredths (.50) of an inch in diameter, and the silver alloy shell therefor six hundredths (.06) of an inch thick, but said shell might be made somewhat thinner.

Having described my invention, I claim:

1. As a new article of manufacture, a composite wire having a mean coefficient of expansion under heat approximately equal to that of the glass used in making incandescent electric lamps, which wire comprises a core of approximately forty percent (40%) nickel and sixty percent (60%) iron, with a welded-on sheath formed of a silver alloy, the silver being the major constituent of said alloy.

2. An article of manufacture such as defined in claim 1 in which another metal alloyed with silver to form said sheath, is copper.

3. As a new article of manufacture, a composite wire having a mean coefficient of expansion under heat approximately equal to that of the glass used in making incandescent electric lamps, which wire comprises a core of approximately forty percent (40%) nickel and sixty percent (60%) iron, with a welded-on sheath formed of an alloy of about sixty-seven percent (67%) silver, thirty-one and a half percent (31½%) copper and about one and a half percent (1½%) tin.

4. In a glass vacuum container having a high resistance electric conductor sealed into the vacuum space, the combination, with the above described apparatus, of leading-in wires for said conductor sealed into said glass having exterior surfaces formed of an alloy of silver and copper, the silver being in excess.

5. In a glass vacuum container having a high resistance electric conductor sealed into the vacuum space, the combination, with the above described apparatus, of leading-in wires for said conductor sealed into said glass having exterior surfaces formed of an alloy of silver, copper and tin, the silver being in excess and the tin being present only in small quantities.

6. In a glass vacuum container having a high resistance electric conductor sealed into the vacuum space, the combination, with the above described apparatus, of leading-in wires for said conductor sealed into said glass having exterior surfaces formed of an alloy of about sixty-seven percent (67%) silver, about thirty-one and a half percent (31½%) copper, and about one and a half percent (1½%) tin.

7. The process of welding a core of nickel iron to an external sheath of metallic composition having a much lower melting point, which comprises heating a billet of such construction by means of an electric current passing through said core.

8. As an article of manufacture, a composite leading-in wire for use in incandescent lamps and similar evacuated containers of glass, which wire comprises a core of about forty percent (40%) nickel and the rest iron, by weight, with an external sheath welded on said core formed of an alloy containing about sixty-seven percent (67%) silver, by weight, and the rest principally copper, the diameter of said core being about four-fifths (⅘) of the external diameter of the said sheath.

JOHN ADAM YUNCK.